United States Patent
Mizukoshi et al.

(10) Patent No.: US 10,889,215 B1
(45) Date of Patent: Jan. 12, 2021

(54) MAT ATTACHMENT STRUCTURE OF SEATBACK AND VEHICLE SEAT

(71) Applicants: Adient Engineering and IP GmbH, Burscheid (DE); HONDA MOTOR CO., LTD., Tokyo (JP)

(72) Inventors: Toshimitsu Mizukoshi, Saitama (JP); Masaki Shimazu, Saitama (JP); Taiji Misono, Saitama (JP); Hiroyuki Yasui, Kanagawa (JP); Motohiko Ozawa, Kanagawa (JP)

(73) Assignees: Adient Engineering and IP GmbH, Burscheid (DE); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/539,373

(22) Filed: Aug. 13, 2019

(51) Int. Cl.
*B60N 2/68* (2006.01)
*B60N 2/64* (2006.01)

(52) U.S. Cl.
CPC ...... *B60N 2/68* (2013.01); *B60N 2/64* (2013.01)

(58) Field of Classification Search
CPC ... B60N 2/68; B60N 2/64; B60N 2/42; B60N 2/427
USPC ....................... 297/216.13, 216.14
See application file for complete search history.

(56) References Cited

U.S. PATENT DOCUMENTS

| | | | |
|---|---|---|---|
| 7,677,659 B2* | 3/2010 | Humer | B60N 2/6671 297/216.14 |
| 2006/0071517 A1* | 4/2006 | Humer | B60N 2/4228 297/216.12 |
| 2019/0315255 A1* | 10/2019 | Onuma | B60N 2/68 |

FOREIGN PATENT DOCUMENTS

| | | | | |
|---|---|---|---|---|
| JP | 2014213738 A | * | 11/2014 | |
| JP | 2015-067172 A | | 4/2015 | |
| JP | 2017144994 A | * | 8/2017 | |
| JP | 6314270 B2 | * | 4/2018 | |

* cited by examiner

*Primary Examiner* — Anthony D Barfield
(74) *Attorney, Agent, or Firm* — Marshall & Melhorn, LLC

(57) ABSTRACT

A mat attachment structure of a seatback includes: a guide wire attached to the mat and provided, at the distal end part, with a straight portion extending in a longitudinal direction of the seatback frame on a tip side of the seatback frame or its root side; and a through-hole formed in the seatback frame and through which the straight portion is insertable. The through-hole is provided with a protruding part which includes a high protruding portion and a low protruding portion formed adjacent to the high protruding portion. In a first movement of the mat, the straight portion moves in a de-insertion direction while coming into contact with the high protruding portion. As the amount of movement of the mat gets larger than the amount of movement of the first movement, a contact position between the straight portion and the protruding part moves toward the low protruding portion.

4 Claims, 6 Drawing Sheets

MAT ATTACHMENT STRUCTURE OF SEATBACK AND VEHICLE SEAT

CROSS-REFERENCE TO RELATED APPLICATIONS

The present application is based on Japanese Patent Application No. 2018-029563, filed on Feb. 22, 2018, the entire contents of which are incorporated herein by reference.

TECHNICAL FIELD

The present application relates to a mat attachment structure of a seatback and a vehicle seat.

BACKGROUND

As for an interior structure of a seatback in a vehicle seat, a structure for attaching a mat for supporting a seating occupant's back to a seatback frame through a guide wire is described in JP 2015-067172 A.

In detail, the guide wire includes a pair of vertical wire parts extending substantially vertically and juxtaposed left and right and a horizontal wire part which connects respective lower parts of the pair of vertical wire parts in the horizontal direction.

Then, the horizontal wire part is pivotally supported to a lower frame, while the pair of vertical wire parts are inserted, with their upper straight portions in the form of straights rods, into insertion holes formed in an upper frame of the seatback frame so as to be movable vertically.

SUMMARY

The conventional seatback for vehicle seat is constructed so that a mat is moved from a natural position rearward by a force applied from a seating occupant's back and the mat is returned to the natural position by an occupant's unseating action. With this forward-and-rearward movement of the mat, the straight portions of the vertical wire parts of the guide wire are adapted so as to slide in the insertion holes of the seatback frame vertically.

The guide wire is provided, on its surface, with a lubricant layer. If there is a pointed tip part, such as a burr, on an edge of the insertion hole, the lubricant layer may be gradually shaved due to a friction between the straight portion and the pointed tip part of the insertion hole, thereby causing the vertical wire part to be vertically moved with difficulty. If the vertical movement of the straight portion becomes dull, then there is a fear of degradation in the quality of feeling of an occupant's back against the seatback at the time of seating since the forward-and-rearward movement of the mat becomes unsmooth.

Additionally, if the seatback is strongly pressed rearward by an occupant's back due to a vehicle collision or the like, the mat might move greatly rearward against the seatback frame, thereby causing a possibility that the straight portions fall out of the insertion holes downward, so that a seating occupant's body cannot be supported by the mat.

In consideration of the above problems, an object of the present application is to provide a mat attachment structure of a seatback and a vehicle seat, both of which ensure that the straight portion of the guide wire moves up and down in the insertion hole of the seatback frame smoothly in the normal forward-and-rearward movement of the mat, and which could prevent the straight portion from coming out of the insertion hole even if the rearward displacement of the mat gets large.

According to an embodiment, there is provided a mat attachment structure of a seatback for attaching a mat to a seatback frame, the mat configured to receive a force from a back of an occupant leaning against the seatback, the attachment structure including: a guide wire attached to the mat, the guide wire provided, at a distal end part thereof, with a straight portion which extends in a longitudinal direction of the seatback frame on a tip side of the seatback frame or a root side thereof; and a through-hole which is formed in the seatback frame and through which the straight portion is insertable in the longitudinal direction. The through-hole is provided, at a periphery thereof, with a protruding part which includes a high protruding portion protruding in a burring shape on an insertion outlet side of the straight portion and a low protruding portion formed adjacent to the high protruding portion with a protruding height smaller than that of the high protruding portion. In a first movement of the mat associated with an occupant's seating action, the straight portion moves in a de-insertion direction while coming into contact with the high protruding portion, and a contact position between the straight portion and the protruding part moves toward the low protruding portion as the amount of movement of the mat gets larger than the amount of movement of the first movement.

In the embodiment, the mat attachment structure may be configured so that when the straight portion moves in the de-insertion direction while coming into contact with the low protruding portion, the low protruding portion bites into the straight portion of the guide wire, whereby the movement of the straight portion in the de-insertion direction is restricted.

According to an embodiment, there is provided a vehicle seat including: a seat cushion; a seatback pivotally connected to the seat cushion; a seatback frame arranged inside the seatback; and a mat configured to receive a force from a back of an occupant leaning against the seatback. The mat is attached to the seatback frame by a mat attachment structure including: a guide wire attached to the mat, the guide wire provided, at a distal end part thereof, with a straight portion which extends in a longitudinal direction of the seatback frame on a tip side of the seatback frame or a root side thereof; and a through-hole which is formed in the seatback frame and through which the straight portion is insertable in the longitudinal direction. The through-hole is provided, at a periphery thereof, with a protruding part which includes a high protruding portion protruding in a burring shape on an insertion outlet side of the straight portion and a low protruding portion formed adjacent to the high protruding portion with a protruding height smaller than that of the high protruding portion. The mat attachment structure is configured so that: a first movement of the mat associated with an occupant's seating action allows the straight portion to be moved in a de-insertion direction while coming into contact with the high protruding portion; and a contact position between the straight portion and the protruding part moves toward the low protruding portion as the amount of movement of the mat gets larger than the amount of movement of the first movement.

In the vehicle seat according to the embodiment, the mat attachment structure may be configured so that when the straight portion moves in the de-insertion direction while coming into contact with the low protruding portion, the low protruding portion bites into the straight portion of the guide wire, whereby the movement of the straight portion in the de-insertion direction is restricted.

With the mat attachment structure of the seatback and the vehicle seat related to the embodiment, the straight portion of the guide wire moves up and down in the insertion hole of the seatback frame smoothly in the normal forward-and-rearward movement of the mat. Further, even if the rearward displacement of the mat gets large, it is possible to prevent the straight portion from coming out of the insertion hole.

DETAILED DESCRIPTION

A frame structure of a vehicle seat ST provided with a mat attachment structure TK of a seatback according to an embodiment will be described with reference to FIG. 1.

Figure 1:
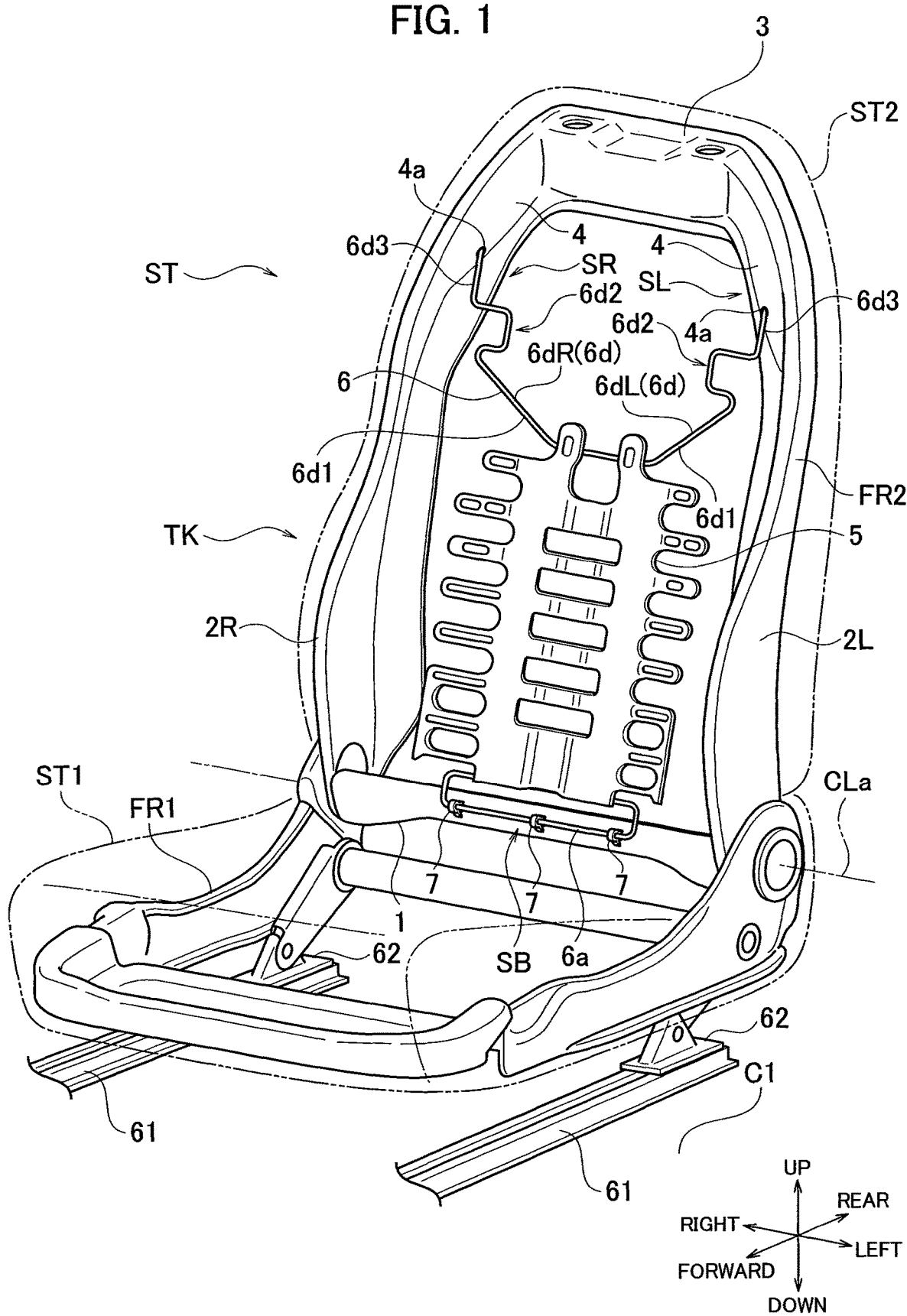
FIG. 1 is a perspective view explaining a frame structure of a vehicle seat according to an embodiment.

FIG. 1 is a perspective view for explaining a frame structure of a vehicle seat ST (it may be simply referred to as "seat ST" hereinafter). In the following description, respective directions of forward, rear, left, right, up, and down directions are defined by arrows illustrated in FIG. 1, based on a state where the seat ST is mounted on a vehicle. The left-and-right direction may be also referred to as "width direction".

As illustrated in FIG. 1, the seat ST includes a seat cushion ST1 where a seat cushion frame FR1 is covered with a cushion member, and a seatback ST2 where a seatback frame FR2 is covered with a cushion member.

A pair of movable rails 62 are attached to a bottom part of the seat cushion frame FR1. The pair of movable rails 62 are supported on a pair of fixed rails 61 as fixed members installed on a vehicle floor C1 of the vehicle so as to be movable in the forward-and-rearward direction. Thus, the seat ST is constructed so as to be slidable to the pair of fixed rails 61 rearward and forward.

At the rear part of the seat cushion frame FR1, the seatback frame FR2 disposed inside the seat ST is supported so as to be rotatable around a rotation axis CLa extending left and right.

The seatback frame FR2 is a so-called "panel frame" in the form of a frame made from a panel, and a direction connecting a root side of the panel frame and its tip side is defined as a longitudinal direction of the panel frame.

Specifically, the seatback frame FR2 includes a lower panel part 1 that extends in the left-and-right direction at the lower part of the seat frame FR2, a left side panel part 2L and a right side panel part 2R both of which stand up from the left and right ends of the lower panel part 1 in the longitudinal direction (i.e. substantially upward-and-downward direction in FIG. 1), and an upper panel part 3 that connects respective leading end portions of the left side panel part 2L and the right side panel part 2R in the left-and-right direction (i.e. width direction).

The upper panel part 3 includes a pair of shoulder portions 4 which are connected to the left side panel part 2L and the right side panel part 2R respectively, at a slant. Each of the shoulder portions 4 is formed with a through-hole 4a (see also FIG. 2).

In the central space surrounded by a frame of the seatback frame FR2, there are arranged a guide wire 6 supported by the seatback frame FR2 and a mat 5 in the form of a thin plate, which is attached to the guide wire 6.

The guide wire 6 is held by the seatback frame FR2 at two supporting parts SL, SR, which are arranged in an upper part of the seatback frame FR2 at left and right positions corresponding to the pair of through-holes 4a, and one supporting part SB in the bottom part of the frame FR2.

Next, the mat 5 and the guide wire 6 will be described with reference to also FIG. 2 and FIG. 3.

Figure 2:
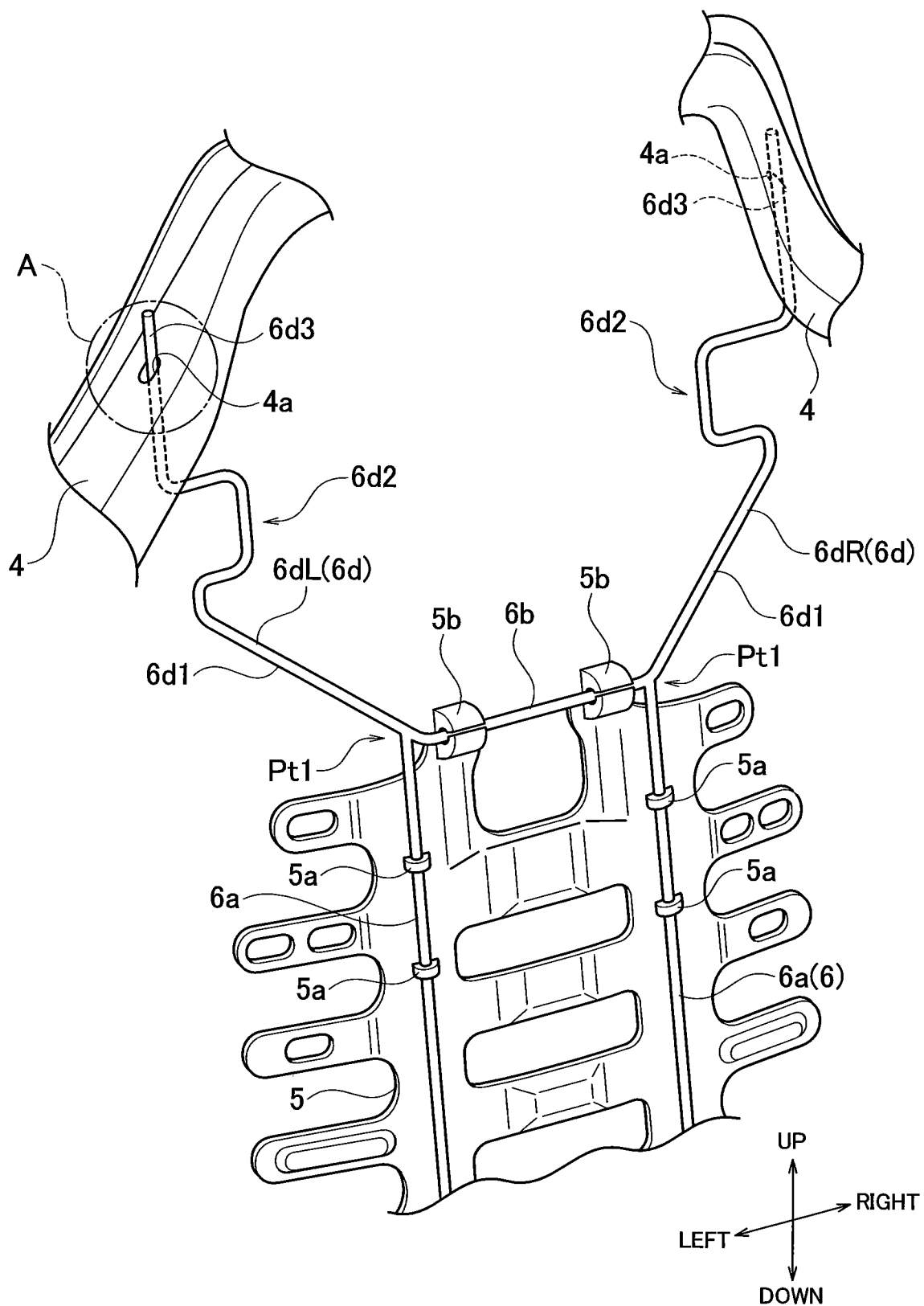
FIG. 2 is a partial perspective view explaining an upper structure of a guide wire and a mat of the vehicle seat according to the embodiment.
Figure 3:
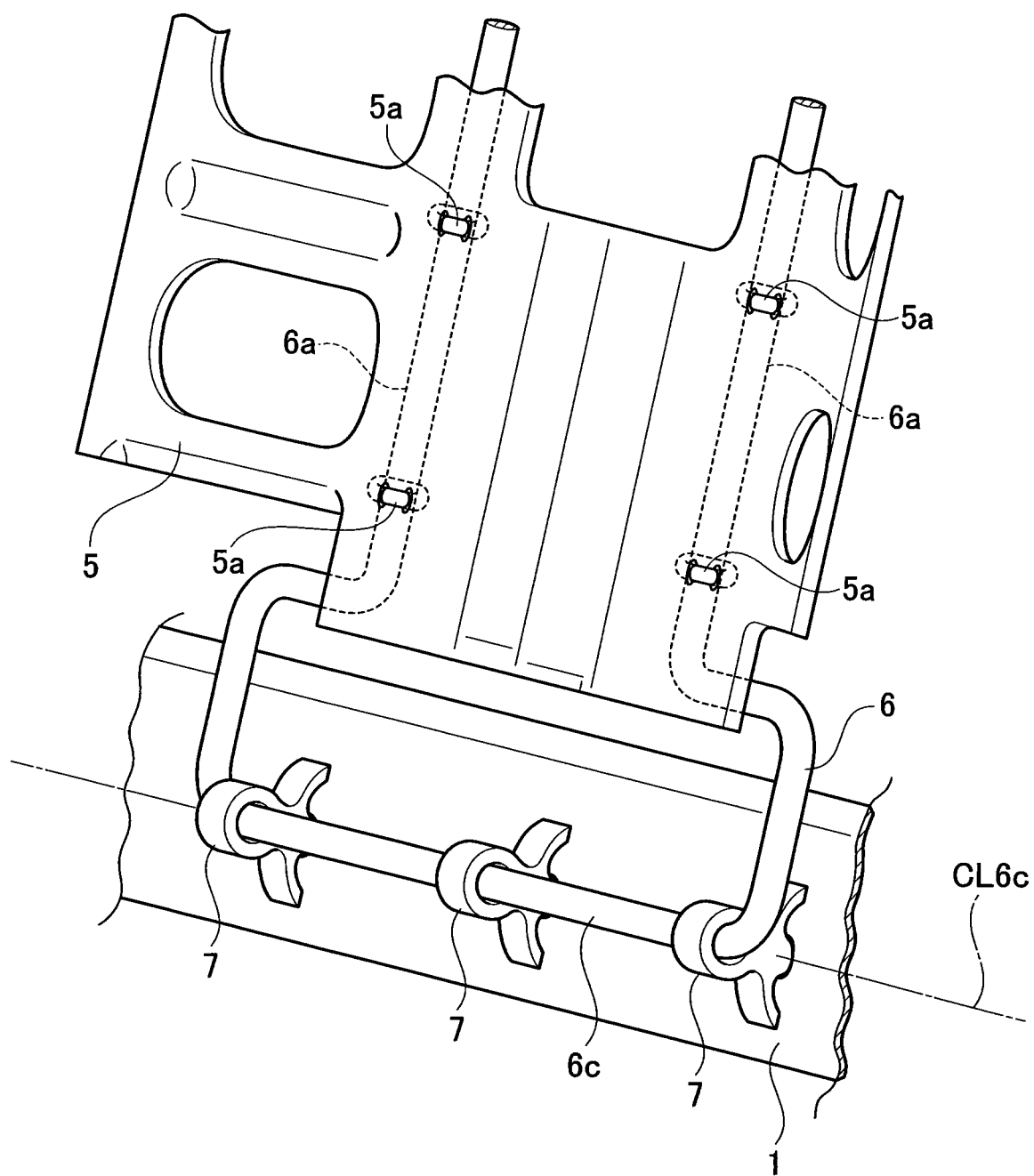
FIG. 3 is a partial perspective view explaining an lower structure of the guide wire and the mat of the vehicle seat according to the embodiment.

FIG. 2 is a partial perspective view of the upper part of the mat 5 as viewed from the rear left and slightly above, while FIG. 3 is a partial perspective view of the lower portion of the mat 5 as viewed from the rear right and slightly above.

The guide wire 6 is made from a wire-like spring material. On the surface of the guide wire 6, there is formed a lubricant layer for improving the sliding performance of the guide wire with the other member.

The guide wire 6 includes a pair of vertical wire parts 6a disposed on the rear surface side of the mat 5 to extend up and down and also separated from each other, an upper connecting part 6b connecting respective upper portions of the pair of vertical wire parts 6a, and a lower connecting part 6c connecting respective lower portions of the vertical wire parts 6a.

The guide wire 6 further includes a pair of arm parts 6d extending from connecting parts Pt1 where the upper connecting part 6b and the vertical wire parts 6a are connected, obliquely to the upper left and the upper right. Hereinafter, the arm part 6d on the left side is referred to as "left arm part 6dL", while the arm part 6d on the right side is referred to as "right arm part 6dR".

The mat 5 is attached to the pair of vertical wire parts 6a and the upper connecting part 6b through a plurality of fasteners 5a, 5b in a manner that the pair of vertical wire parts 6a and the upper connecting part 6b are deformed together by an external force without being separated from each other.

The lower connecting part 6c is shaped straightly. The lower connecting part 6c is attached to the lower panel part 1 by a plurality of holders 7 (three holders in the embodiment) so as to be rotatable around an axis CL6c of the lower connecting part 6c extending in the left-and-right direction.

The holders 7 are made of resin, for example. Each holder 7 is attached to the lower panel part 1 by a well-known attachment structure (in the embodiment, a snap fit structure).

Figure 4:
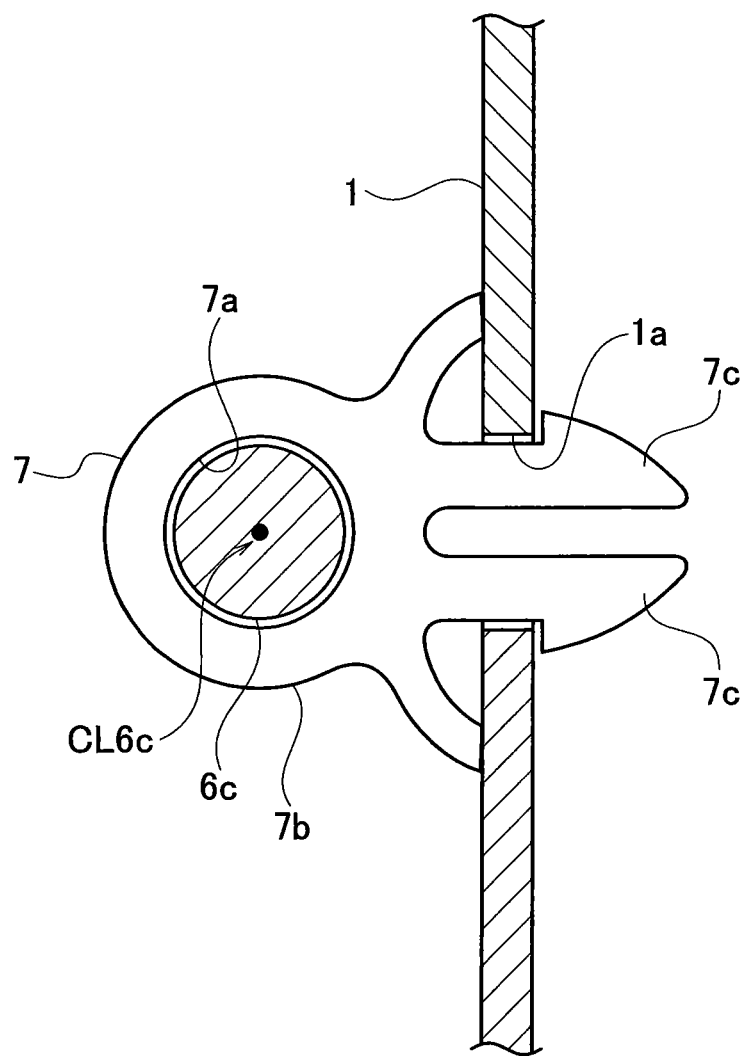
FIG. 4 is a sectional view explaining a holder for fixing the guide wire to a lower panel part.

The attaching state of the holder 7 is illustrated in a sectional view of FIG. 4.

As illustrated in FIG. 4, the holder 7 includes a base part 7b having an insertion hole 7a and a pair of engagement legs 7c protruding from the base part 7b.

The lower connecting part 6c is inserted into the insertion hole 7a so as to be rotatable around the axis CL6c. The holder 7 is attached to the lower panel part 1 by snap fitting where the pair of engagement legs 7c are inserted in and engaged with an engagement hole 1a formed in the lower panel part 1, with elastic deformation.

The left arm part 6dL and the right arm part 6dR are formed symmetric laterally. Hereinafter, the right arm part 6dR will be described as a representative, and reference numerals indicating various portions are respectively common in the left and right arm parts.

The right arm part 6dR includes an inclined extended portion 6d1 extending obliquely upward from the connecting part Pt1 where the upper connecting part 6b and the vertical wire part 6a are connected, a bent portion bent 6d2 in the left-and-right direction to improve torsion and bending elasticity of the right arm part 6dR, and a straight portion 6d3 extending straight upward from the bent portion 6d2.

The straight portion 6d3 is inserted into the through-hole 4a of the shoulder part 4 from downward to upward so as to be movable up and down.

Accordingly, in a lower section of the mat 5 and the guide wire 6, the lower connecting part 6c of the guide wire 6 is supported by the lower panel part 1 through the holders 7 so as to be rotatable around the axis CL6c. On the other hand, in an upper section of the mat 5 and the guide wire 6, it is supported by the shoulder part 4 while the straight portions 6d3 are being inserted into the through-holes 4a. In this way, the mat 5 and the guide wire 6 are attached to the seatback frame FR2 so as to be movable forward and rearward elastically.

Next, the detailed shape of the through-hole 4a will be described with reference to FIG. 5.

Figure 5:
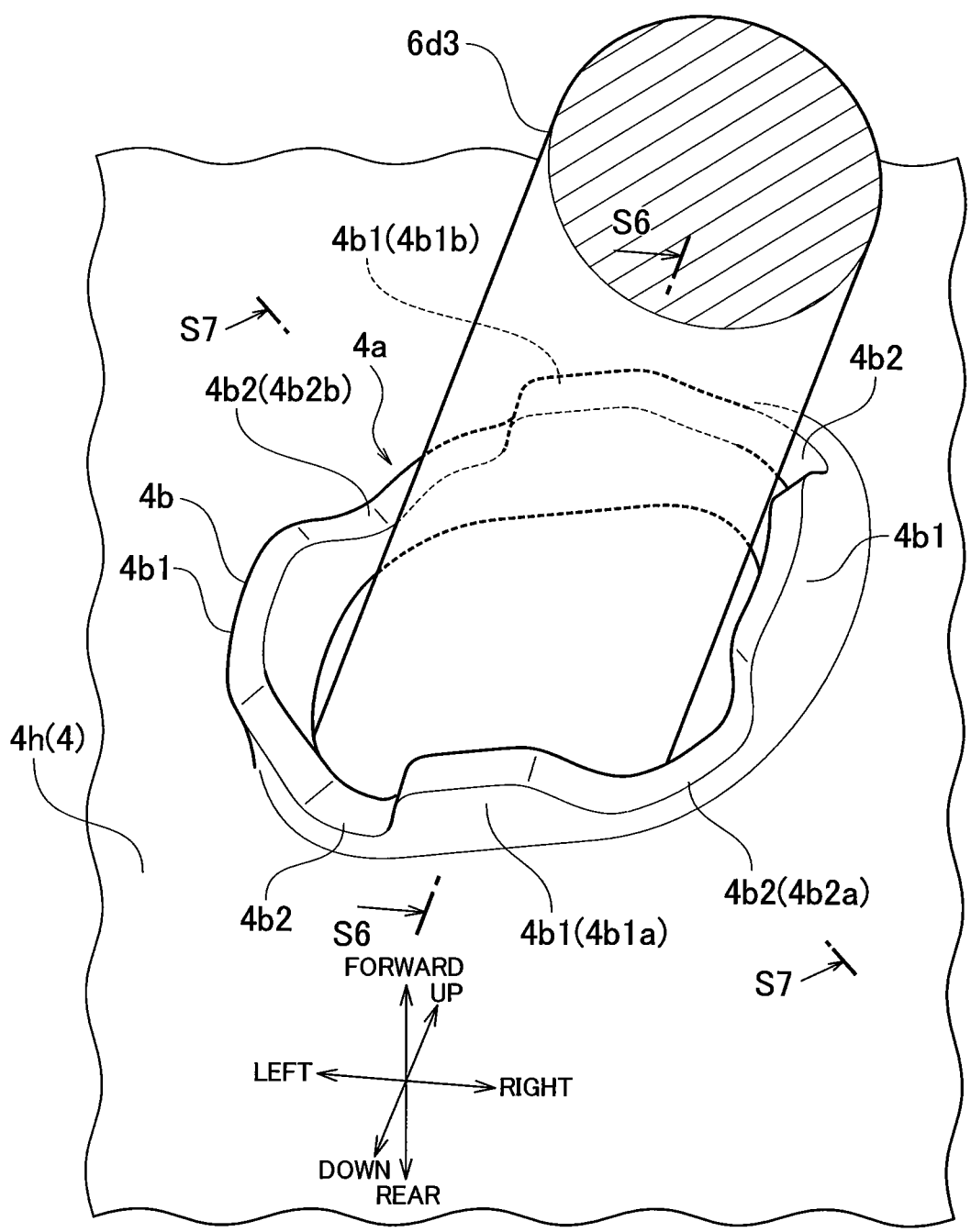
FIG. 5 is a partial perspective view explaining a through-hole in a shoulder part of an upper panel part and a straight portion of the guide wire inserted into the through-hole.

FIG. 5 is an enlarged perspective view of a portion A in FIG. 2, explaining the straight portion 6d3 of the left arm part 6dL of the guide wire 6 and the through-hole 4a of the left shoulder part 4 through which the straight portion 6d3 is inserted.

Also, FIG. 5 illustrates a condition where an occupant does not put an occupant's back on the seatback ST2, that is, a situation of the straight portion 6d3 and the through-hole 4a in a natural state where no external force is applied to the mat 5.

At the periphery of the through-hole 4a, as illustrated in FIG. 5, there is formed a protruding part 4b protruding upward by burring work or the like.

The protruding part 4b includes high protruding portions 4b1 each having a high protruding height and low protruding portions 4b2 each having a protruding height lower than that of the high protruding portion 4b1 and also protruding from the surface 4h of the shoulder part 4 slightly.

The high protruding portions 4b1 are formed in a direction along which the straight portion 6d3 in the through-hole 4a is inclined by the deformation of the mat 5 and the guide wire 6 associated with the normal seating and unseating actions of an occupant (in this example, generally in the front-and-rear direction).

In the illustrated example, the periphery of the through-hole 4a is divided into generally-eight equal sections, and the protruding part 4b are composed of: four high protruding portions 4b1 (one pair of protruding portions in the front-and-rear direction and one pair of protruding portions in the left-and-right direction); and four low protruding portions 4b2 existing in respective oblique directions (i.e. left front direction, right front direction, left rear direction and right rear direction)

For convenience of the following description, the high protruding portion 4b1 on the rear side is defined as a first high protruding portion 4b1a, while the high protruding portion 4b1 on the front side is defined as a second high protruding portion 4b1b. Similarly, the low protruding portion 4b2 on the right-and-rear side is defined as a first low protruding portion 4b2a, while the low protruding portion 4b2 on the left-and-front side is defined as a second low protruding portion 4b2b.

The protruding part 4b including the high protruding portions 4b1 and the low protruding portions 4b2 is manufactured by the following processing method, for example.

First, it is performed to form, as a prepared hole, a cross-shaped hole having a circumscribed circle having a smaller diameter than the inner diameter φ4a of the through-hole 4a. Then, the burring work is carried out to protrude portions each extending inside a circle having the inner diameter φ4a concentric with the circumscribed circle.

Of course, it should be noted that the manufacturing method of the protruding part 4b is not limited to the above-mentioned method only.

When the natural state illustrated in FIG. 5 is changed to a seating state where an occupant is sitting on the seat ST and also putting an occupant's back on the seatback ST2, the mat 5 moves rearward. As a result, the guide wire 6 is deformed so that the straight portion 6d3 moves in the through-hole 4a downward.

In a situation where an occupant is leaning the back against the seatback ST2 in the normal seating state, the rearward movement of the mat 5 and the deformation amount of the guide wire 6 are small. Consequently, the straight portion 6d3 moves downward in an inclined posture as a result that the lower side (the mat 5 side) substantially moves rearward.

Figure 6:
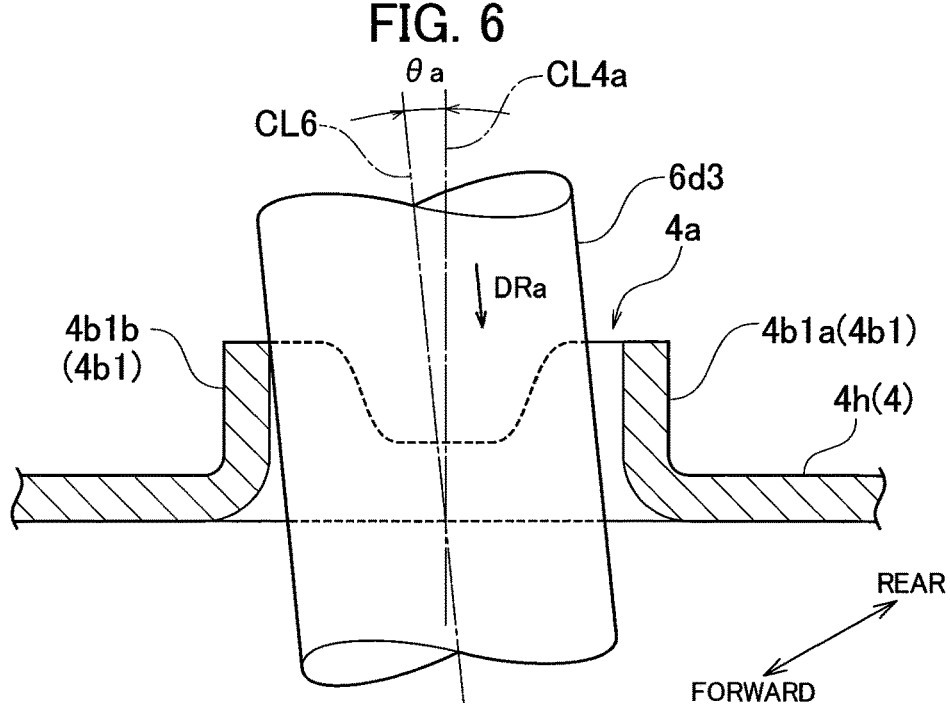
FIG. 6 is a partial sectional view explaining a contact relationship between the straight portion and the through-hole in an occupant seated condition.

FIG. 6 illustrates such a condition state. In FIG. 6, the through-hole 4a is illustrated with a cross section taken along a line S6-S6 of FIG. 5.

With the rearward movement of the mat 5 associated with the normal seating action, as illustrated in FIG. 6, the straight portion 6d3 is inclined to the axis CL4a of the through-hole 4a at an angle θa so that its tip side (the upper side in FIG. 6) approaches the second high protruding portion 4b1b and furthermore, the straight portion 6d3 moves downward while making contact with the second high protruding portion 4b1b (in the direction of an arrow DRa).

Meanwhile, each of the high protruding portions 4b1 is formed with a protruding height sufficient for a burring shape, and the inner surface of the high protruding portion 4b1 on the tip side is substantially parallel to the axis CL4a.

Therefore, the contact angle between the straight portion 6d3 and the second high protrusion 4b1b becomes the angle θa substantially. The angle θa is set to be a small angle with a margin so that the lubricant layer formed on the surface of the straight portion 6d3 wouldn't be scraped away even when the straight portion 6d3 moves downward while being in contact with the second high protruding portion 4b1b at the angle θa.

As the amount of rearward movement of the mat 5 increases, the straight portion 6d3 has its root side facing rearward and inward. That is, the contact position between the straight portion 6d3 and the protruding part 4b gradually moves from the second high protruding portion 4b1b to the adjacent second low protruding portion 4b2b.

Unlike the rearward movement of the mat 5 associated with the normal seating action, when the seatback ST2 is strongly pushed backward by an occupant's back (for example, a case that a vehicle is rear-end collided while an occupant is being seated), in other words, if the amount of the rearward movement of the mat 5 is sufficiently large, the amount of deformation of the arm part 6*d* of the guide wire 6 also increases, so that the straight portion 6*d*3 moves downward while keeping a posture that its tip side (the upper side in FIG. 6) is inclined greatly and diagonally forward left.

Figure 7:
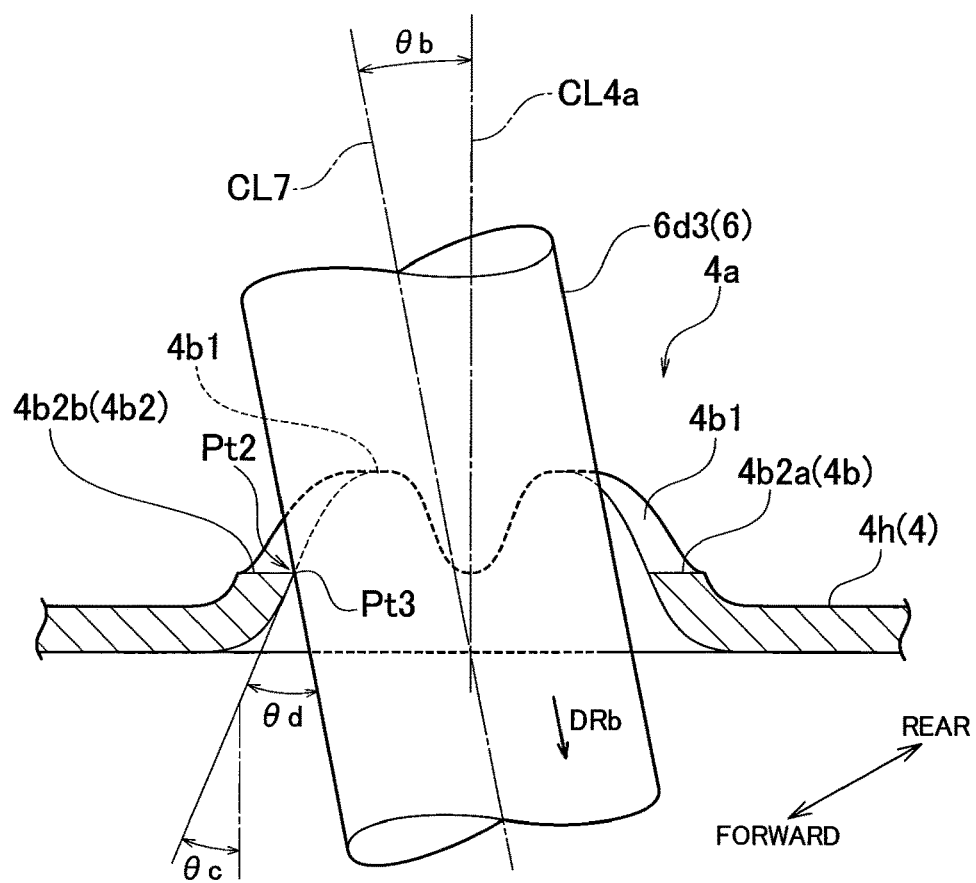
FIG. 7 is a partial sectional view explaining a contact relationship between the straight portion and the through-hole under condition that the mat moves rearward greatly.

As a result, the straight portion 6*d*3 moves downward (in the direction of an arrow DRb) while being in contact with the second low protruding portion 4*b*2*b* which is formed diagonally forward left at the periphery of the through-hole 4*a*. FIG. 7 illustrates such a condition state. In FIG. 7, the through-hole 4*a* is illustrated with a cross section taken along a line S7-S7 of FIG. 5.

Here, it is noted that each of the low protruding portions 4*b*2 is formed with a protruding height insufficient for the burring shape, and the inner surface of the low protruding portion 4*b*2 on the tip side is curved and inclined to the axis CL4*a* by an angle θc so as to gradually approach the axis CL4*a* toward the tip side.

Meanwhile, the angle between the axis CL7 of the straight portion 6*d*3 and the axis CL4*a* of the through-hole 4*a* is an angle θb larger than the angle θa since the rearward movement amount of the mat 5 is large.

Therefore, the contact angle of the side surface of the straight portion 6*d*3 with respect to the axis CL4*a* at the contact point Pt3 where the straight portion 6*d*3 comes into contact with the low protruding portion 4*b*2 becomes an angle θd which is substantially the sum of the angle θb and the angle θc (i.e. angle θd=angle θb+angle θc).

Further, since each of the low protruding portions 4*b*2 is raised insufficiently, a tip corner part Pt2 of the low protruding portions 4*b*2 on the inner surface side has a "sharp-pointed projecting" shape having a cross section with a sharp angle.

Therefore, when the straight portion 6*d*3 moves downward in the through-hole 4*a* to come into contact with the low protruding portion 4*d*2, the tip corner part Pt2 of the low protruding portion 4*d*2 easily bites into the straight portion 6*d*3 and prevents the downward movement of the straight portion 6*d*3 since the contact angle between the straight portion 6*d*3 and the low protruding portion 4*d*2 is larger than that at the time of normal seating action (that is, the angle θd), and the tip corner part Pt2 of the low protruding portion 4*d*2 has the "sharp-pointed projecting" shape.

In particular, when a large acceleration occurs due to a traffic accident such as a rear-end collision, the inclination descending speed of the straight portion 6*d*3 rapidly increases and therefore, the biting is more likely to occur.

In this way, in the mat attachment structure TK, when the mat 5 is moved rearward in the normal seating action, the straight portion 6*d*3 comes into contact with the high protruding portion 4*d*1 at the periphery of the through-hole 4*a* and moves downward smoothly. When the mat 5 largely moves rearward due to a rear-end collision or the like, the straight portion 6*d*3 comes into contact with the low protruding portion 4*d*2 to cause a biting, so that the downward movement of the straight portion 6*d*3 is restricted.

Therefore, the straight portion 6*d*3 is prevented from coming out of the through-hole 4*a*.

Consequently, according to the mat attachment structure TK and the vehicle seat ST including the mat attachment structure TK, even if the normal seating action is repeated, there is no possibility of degrading the quality in the feeling of an occupant's back on the seatback ST2 at the time of seating. Further, since the guide wire 6 does not come out of the upper panel part 3 even in a rear-end collision or the like, the body of a seating occupant can be supported by the mat 5 of the seatback ST2 firmly.

Without being limited to the embodiment described above, the present invention may be modified variously without departing from the gist of the present invention.

For instance, in the mat attachment structure TK of the embodiment, the upper part of the guide wire 6 (i.e. the straight portion 6*d*3) is inserted into and supported by the through-hole 4*a*, while the lower part of the guide wire 6 is formed with the lower connecting part 6*c* and also supported on the frame side through the holders 7. However, this structure may be adapted upside down.

That is, the lower part of the guide wire 6 may be formed with a straight portion and also configured to be inserted into and supported by the through-hole on the frame side, provided that the upper part of the guide wire 6 is supported on the frame side through the holders 7.

What is claimed is:

1. A mat attachment structure of a seatback for attaching a mat to a seatback frame, the mat configured to receive a force from a back of an occupant leaning against the seatback, the mat attachment structure comprising:
a guide wire attached to the mat, the guide wire provided, at a distal end part thereof, with a straight portion which extends in a longitudinal direction of the seatback frame on a tip side of the seatback frame or a root side thereof; and
a through-hole which is formed in the seatback frame and through which the straight portion is insertable in the longitudinal direction, wherein
the through-hole is provided, at a periphery thereof, with a protruding part which includes a high protruding portion protruding in a burring shape on an insertion outlet side of the straight portion and a low protruding portion formed adjacent to the high protruding portion with a protruding height smaller than that of the high protruding portion, and
the mat attachment structure is configured so that:
a first movement of the mat associated with an occupant's seating action allows the straight portion to be moved in a de-insertion direction while coming into contact with the high protruding portion; and
a contact position between the straight portion and the protruding part moves toward the low protruding portion as the amount of movement of the mat gets larger apart from the amount of movement of the first movement.

2. The mat attachment structure of claim 1, wherein when the straight portion moves in the de-insertion direction while coming into contact with the low protruding portion, the low protruding portion bites into the straight portion of the guide wire, whereby the movement of the straight portion in the de-insertion direction is restricted.

3. A vehicle seat, comprising:
a seat cushion;
a seatback;
a seatback frame arranged inside the seat back; and
a mat configured to receive a force from a back of an occupant leaning against the seatback, wherein
the mat is attached to the seatback frame by a mat attachment structure comprising:
a guide wire attached to the mat, the guide wire provided, at a distal end part thereof, with a straight portion which extends in a longitudinal direction of the seatback frame on a tip side of the seatback frame or a root side thereof; and a through-hole which is formed in the seatback frame and through which the straight portion is insertable in the longitudinal direction, wherein the through-hole is provided, at a periphery thereof, with a protruding part which includes a high protruding portion protruding in a burring shape on an insertion outlet side of the straight portion and a low protruding portion formed adjacent to the high protruding portion with a protruding height smaller than that of the high protruding portion, and the mat attachment structure is configured so that:
- a first movement of the mat associated with an occupant's seating action allows the straight portion to be moved in a de-insertion direction while coming into contact with the high protruding portion; and
- a contact position between the straight portion and the protruding part moves toward the low protruding portion as the amount of movement of the mat gets larger apart from the amount of movement of the first movement.

4. The vehicle seat of claim 3, wherein when the straight portion moves in the de-insertion direction while coming into contact with the low protruding portion, the low protruding portion bites into the straight portion of the guide wire, whereby the movement of the straight portion in the de-insertion direction is restricted.

* * * * *